United States Patent
Butt et al.

(10) Patent No.: US 8,621,050 B2
(45) Date of Patent: *Dec. 31, 2013

(54) DYNAMIC RUN-TIME CONFIGURATION INFORMATION PROVISION AND RETRIEVAL

(75) Inventors: Kevin D. Butt, Tucson, AZ (US); Jose G. Miranda Gavillan, Tucson, AZ (US); Leonard G. Jesionowski, Tucson, AZ (US); Yun Mou, Tucson, AZ (US); Khanh V. Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/856,810

(22) Filed: Aug. 16, 2010

(65) Prior Publication Data
US 2010/0312864 A1    Dec. 9, 2010

Related U.S. Application Data

(63) Continuation of application No. 11/694,706, filed on Mar. 30, 2007, now Pat. No. 7,818,404.

(51) Int. Cl.
*G06F 15/177* (2006.01)
*G06F 9/44* (2006.01)

(52) U.S. Cl.
USPC ............................ 709/220; 711/170; 719/327

(58) Field of Classification Search
USPC ............ 709/220, 223, 225; 710/74; 707/204; 719/327; 711/170
See application file for complete search history.

(56) References Cited

U.S. PATENT DOCUMENTS

| | | | |
|---|---|---|---|
| 5,471,609 A | 11/1995 | Yudenfriend et al. | |
| 5,892,955 A | 4/1999 | Ofer | |
| 6,151,684 A | 11/2000 | Alexander et al. | |
| 6,851,005 B1 | 2/2005 | Gnanasivam et al. | |
| 7,103,653 B2 * | 9/2006 | Iwatani | 709/223 |
| 7,428,583 B1 * | 9/2008 | Lortz et al. | 709/223 |
| 7,818,404 B2 * | 10/2010 | Butt et al. | 709/220 |
| 2004/0139196 A1 | 7/2004 | Butler et al. | |
| 2005/0033888 A1 | 2/2005 | Qi | |
| 2005/0044244 A1 | 2/2005 | Warwick et al. | |
| 2005/0055572 A1 | 3/2005 | Warwick et al. | |
| 2005/0114574 A1 * | 5/2005 | Okamoto et al. | 710/74 |
| 2007/0112931 A1 | 5/2007 | Kuik et al. | |
| 2007/0288535 A1 * | 12/2007 | Shitomi et al. | 707/204 |
| 2008/0028049 A1 * | 1/2008 | Taguchi et al. | 709/220 |

* cited by examiner

*Primary Examiner* — Jungwon Chang
(74) *Attorney, Agent, or Firm* — Terrile, Cannatti, Chambers & Holland, LLP; Stephen A. Terrile

(57) ABSTRACT

A system employing a storage device and a host for configuration information exchange between the host and the storage device. In operation, the host manages host configuration information in a data management layer of a communication model, and communicates the host configuration information to the storage device by one or more data communication layers of the communication model. Likewise, the storage device manages storage device configuration information in the data management layer of the communication model, and communicates the storage device configuration information to the host by one or more data communication layers of the communication model.

25 Claims, 19 Drawing Sheets

122

| BIT BYTE | 7 | 6 | 5 | 4 | 3 | 2 | 1 | 0 |
|---|---|---|---|---|---|---|---|---|
| 0 | OP CODE ||||||||
| 1 | RESERVED |||| SERVICE ACTION ||||
| 2 | RESERVED ||||||||
| 3 | ||||||||
| 4 | ||||||||
| 5 | ||||||||
| 6 | ||||||||
| 7 | ||||||||
| 8 | FIRST DEVICE ATTRIBUTE IDENTIFIER ||||||||
| 9 | ||||||||
| 10 | (MSB) |||||||  |
| 11 | ALLOCATION LENGTH ||||||||
| 12 | ||||||||
| 13 |  ||||||| (LSB) |
| 14 | RESERVED ||||||||
| 15 | CONTROL ||||||||

| CODE | NAME | DESCRIPTION | REFERENCE |
|---|---|---|---|
| 00h | DEVICE ATTRIBUTE VALUES | RETURN DEVICE ATTRIBUTE VALUES | "DEVICE ATTRIBUTE VALUES SERVICE ACTION" (*FIG. 14*) |
| 01h | DEVICE ATTRIBUTE LIST | RETURN A LIST OF AVAILABLE DEVICE ATTRIBUTE IDENTIFIERS (NONEXISTENT/UNSUPPORTED) | "DEVICE ATTRIBUTE VALUES SERVICE ACTION" (*FIG. 14*) |
| 02h | DEVICE ATTRIBUTE VALUES (CONNECTED HOSTS) | | |
| 03h | DEVICE ATTRIBUTE LIST (CONNECTED HOSTS) | | |
| 04h-1F | RESERVED | | |

| CODE | NAME | DESCRIPTION |
|---|---|---|
| 00b | BINARY | THE DEVICE ATTRIBUTE VALUE FIELD CONTAINS BINARY DATA |
| 01b | ASCII | THE DEVICE ATTRIBUTE VALUE FIELD CONTAINS LEFT-ALIGNED ASCII DATA |
| 10b - 11b | | RESERVED |

| DEVICE ATTRIBUTE IDENTIFIER | DESCRIPTION | LENGTH | FORMAT (FIG. 17) | REFERENCE |
|---|---|---|---|---|
| 000h | HOST NAME | | ASCII | |
| 0010h | HOST BUS ADAPTER (HBA) DEVICE NAME | | ASCII | |
| 0011h | HBA MANUFACTURER | | | |
| 0012h | HBA FIRMWARE VERSION | | ASCII | |
| 0020h | HBA DEVICE DRIVER DEVELOPER | | ASCII | |
| 0021h | HBA DEVICE DRIVER VERSION | | ASCII | |
| 0030h | DEVICE SPECIAL FILE NAME (DSFN) | | ASCII | |
| 0100h | OPERATION SYSTEM (OS) | | ASCII | |
| 0110h | OS VERSION | | ASCII | |
| 0120h | OS DEVICE DRIVER DEVELOPER | | | |
| 0121h | OS DEVICE DRIVER VERSION | | | |
| 0130h | TAPE DEVICE DRIVER DEVELOPER | | | |
| 0131h | TAPE DEVICE DRIVER VERSION | | | |
| 0200h | APPLICATION NAME | | | |
| 0201h | APPLICATION VERSION | | ASCII | |

| DEVICE ATTRIBUTE IDENTIFIER | DESCRIPTION | LENGTH | FORMAT (FIG. 17) | REFERENCE |
|---|---|---|---|---|
| | LIBRARY NAME | | | |
| | LOGICAL LIBRARY | | | |
| | ELEMENT ADDRESS IN LIBRARY | | | |
| | LIBRARY MANUFACTURER | | | |
| | LIBRARY FIRMWARE VERSION | | | |
| | FEATURES – ENABLED (ONE STRING OR A VENDOR-SPECIFIC LIST OF FEATURES?) | | | |
| | ELEMENT ADDRESS(ES) OF CONTROL PATH DRIVE(S) | | | |
| | HOST ATTRIBUTES OF SPECIFIED HOST SEEN BY SPECIFIED ELEMENT ADDRESS | | | |

| DAT | DESCRIPTION | LENGTH | FORMAT | REF |
|---|---|---|---|---|
| | DRIVE NAME | | | |
| | T10 VENDOR IDENTIFICATION | | | |
| | PRODUCT IDENTIFICATION | | | |
| | PRODUCT REVISION LEVEL | | | |
| | MANUFACTURER SEASON | | | |
| | PORT NAME (wwpn) | 8 | binary | |
| | NODE NAME (wwnn) | 8 | binary | |
| | PORT ADDRESS (e.g., D_ID, SCSI_ID) | 4 | binary | |
| | HOST INFO OF RESERVATION HOLDER | | | |
| | HOST INFO OF RESERVATION HOLDER(S) | | | |
| | TYPE OF RESERVATION IN EFFECT | | | |
| | HOST INFO OF MEDIA REMOVAL PREVENTED HOLDER(S) | | | |
| | HOST INFO OF LAST HOST TO READ MORE THAN A LABEL | | | |
| | HOST INFO OF LAST HOST TO WRITE | | | |
| | HOST INFO OF LAST HOST TO POSITION MEDIUM | | | |
| | HOST INFO OF LAST HOST TO GET RESERVATION CONFLICT TO A RESERVE/ RELEASE/PERSISTENT RESERVE TYPE COMMAND | | | |

| DAT | DESCRIPTION | LENGTH | FORMAT | REF |
|---|---|---|---|---|
| | HOST INFO OF LAST HOST TO RECEIVE CC FOR UNSUPPORTED OP CODE | | | |
| | COUNT OF MEDIA ACCESS COMMANDS RECEIVED FROM EACH HOST | | | |
| | COUNT OF MODE PARAMETER CHANGES RECEIVED FROM EACH HOST | | | |
| | COUNT OF SECURITY CHANGES REQUESTED FROM EACH HOST | | | |
| | COUNT OF SECURITY QUERIES RECEIVED FROM EACH HOST | | | |

DYNAMIC RUN-TIME CONFIGURATION INFORMATION PROVISION AND RETRIEVAL

This application is a continuation of application Ser. No. 11/694,706, filed Mar. 30, 2007 now U.S. Pat. No. 7,818,404, which is incorporated herein by reference in its entirety.

FIELD OF THE INVENTION

The present invention generally relates to storage environments (e.g., a storage area network environment). The present invention specifically relates to relationships between host and storage devices in executing input/output ("I/O") operations.

BACKGROUND OF THE INVENTION

At many situations, users may want to know the relationship between their storage devices and hosts on certain I/O operations. For example, if a user gets a Reservation Conflict error message when the user is attempting to access a storage device, then the user may want to know which host is currently holding the reservation in order to resolve. Also by example, if the user gets a Medium Removal Prevented error message when the user is attempting to unload a tape cartridge from a tape drive, then the user may want to know which host or hosts have issued a Prevent Medium Removal command on the tape drive. These exemplary situations have been seen many times in storage environments. The known solution of solving these situations is for the user to reset the storage device.

Furthermore, each storage device can be represented with a device special file name ("DSFN") on host, such as, for example, /dev/rmt0, /dev/rmt1, etc. for tape drives on AIX. At many situations, a user may want to know a correlation between their storage devices and the device special file names configured on a host from a display on the storage device side. For example, a user may want to know whether a tape library's first drive is configured as rmt0 or rmt1 on host A from the library's front panel or Web GUI display. Currently there is no known solution for this feature.

In summary, there is a need for a method to dynamically communicate the runtime host names and device special file names established by hosts to storage devices in a storage environment.

SUMMARY OF THE INVENTION

The present invention provides various new and unique embodiments for a configuration information exchange between the host and a storage device during a configuration of at least one of the host and the storage device.

A first form of the present invention is a host comprising a processor, and a memory storing instructions operable with the processor for a configuration information exchange between the host and a storage device. The instructions are executed for the host managing host configuration information in a data management layer of a communication model, and the host communicating the host configuration information to the storage device by at least one data communication layer of the communication model.

A second form of the present invention is in a system including a storage device and a host in electrical communication with the storage device. The second form is a method for a configuration information exchange between the host and the storage device. The method comprises the host managing host configuration information in a data management layer of a communication model, and the host communicating the host configuration information to the storage device by at least one data communication layer of the communication model.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIGS. 10-21 illustrates exemplary format tables in accordance with the present invention.

DETAILED DESCRIPTION

Figure 1:
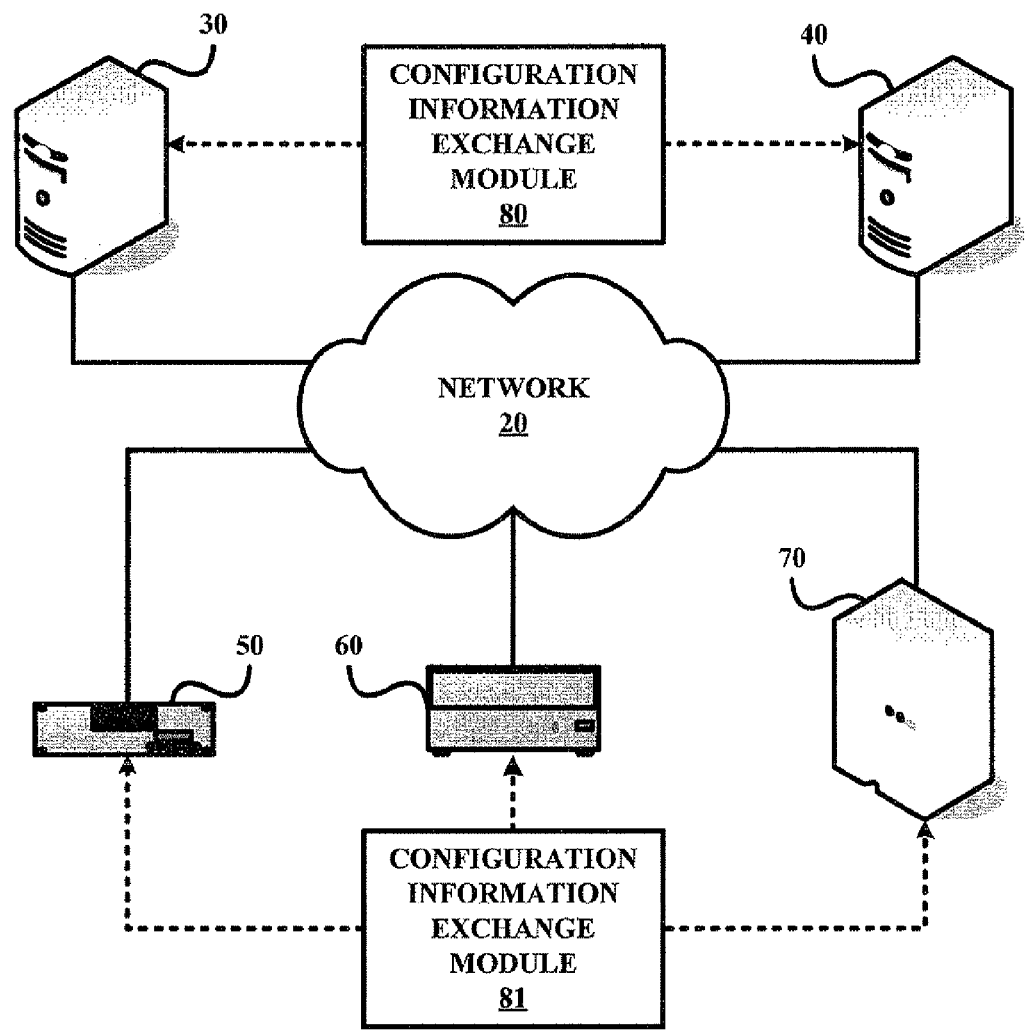
FIG. 1 illustrates an exemplary storage environment for practicing one embodiment of the present invention.

FIG. 1 illustrates a storage environment encompassing a network 20 interconnecting a pair of hosts 30 and 40 to three (3) storage devices in the form of a tape drive 50, an optical drive 60, and an automated tape library 70. The various embodiments of the present invention are premised an exchange of configuration information between hosts 30, 40 and storage devices 50, 60, 70 by an inclusion of the configuration information in a data management layer of a communication model of any type (e.g., a SCSI protocol layer of a SCSI architectural model) for subsequent communication of the configuration information via data communication layer(s) of the communication model (e.g., a parallel SCSI transport layer, a fibre channel transport layer or a SSA transport layer of a SCSI architectural model). To this end, a configuration information exchange module 80 of the present embodiment is installed on hosts 30 and 40 and a configuration information exchange module 81 of the present embodiment is installed on storage devices 50, 60, 70 with modules 80 and 81 being structurally configured with software and/or firmware to facilitate an exchange of configuration information between host 30 and 40 and storage devices 50, 60, 70 in accordance with the present embodiment.

Specifically, modules 80 and 81 are structured in accordance with an information exchange method of the present embodiment. To facilitate an understanding of the information exchange method, a flowchart 90 illustrated in FIGS. 3-5 will now be described herein in the context of FIG. 2 showing host 30 and library 70 with host 30 having an application 31, a device driver 32 and a host bus adapter 33, and with host 30 being interconnected to library 70 via a service delivery subsystem 21 (e.g., one or more physical interconnect(s) such as bridges, routers, switches, cables, etc.).

Figure 2:
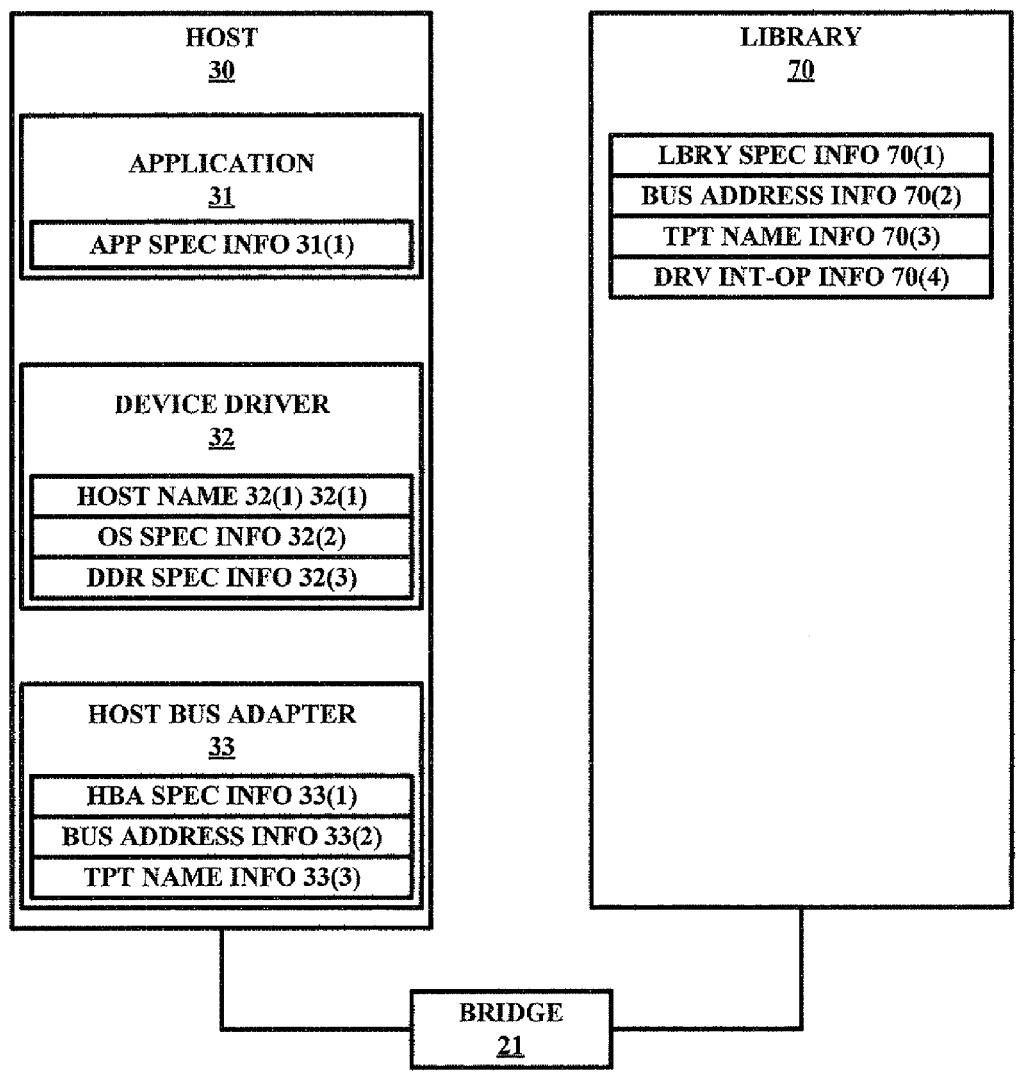
FIG. 2 illustrates an exemplary embodiment of a host and a library in accordance with the present invention.

Prior to the exchange of configuration information as shown in FIG. 2, application 31 includes configuration information in the form of application specification information 31(1) indicative of operating details of various components of application 31 (e.g., an application name of application 31 and an application version of application 31).

Device driver 32 includes configuration information in the form of a host name 32(1) established by host 30 for purposes of I/O operations between host 30 and library 70, operating system specification information 32(2) indicative of operating details of various components of an operating system of host 30 (e.g., an operating system name, an operating system version, and operating system device driver information), device driver specification information 32(3) indicative of operating details of various components of device driver 32 (e.g., the device driver developer and the device driver version).

Host bus adapter 33 includes configuration information in the form of HBA specification information 33(1) indicative of operating details of various components of HBA 33 (e.g., a HBA manufacturer, a HBA device name, a HBA f/w version and HBA device driver information), bus address information 33(2) associated with communication operations of HBA 33 (e.g., an internal host bus address of HBA 33 and a host bus address of HBA 33 as seen by host 30 via service delivery subsystem 21), and transport name information 33(3) associated with communication operations of HBA 33 (e.g., an internal transport name of HBA 33 and a transport name of HBA 33 as seen by host 30 via service delivery subsystem 21).

Library 70 includes configuration information in the form of library specification information 70(1) indicative of operation details of various drive components of library 70 (e.g., a device serial number, a device code level, a device product name), bus address information 70(2) associated with communication operations of library 70 (e.g., an internal bus address of library 70 and a bus address of library 70 as seen by library 70 via service delivery subsystem 21), and transport name information 70(3) associated with communication operations of library 70 (e.g., internal transport names of various drives of library 70 and transport names of various drives of library 70 as seen by library 70 via service delivery subsystem 21), and drive inter-operational information 70(4) indicative of relationships between drives of library 70 (e.g., element addresses of drives in library 70, special behaviors/features of element address of drives in library 70 and host attributes of host 30 as seen by specific element address(es) in library 70).

Figure 3:
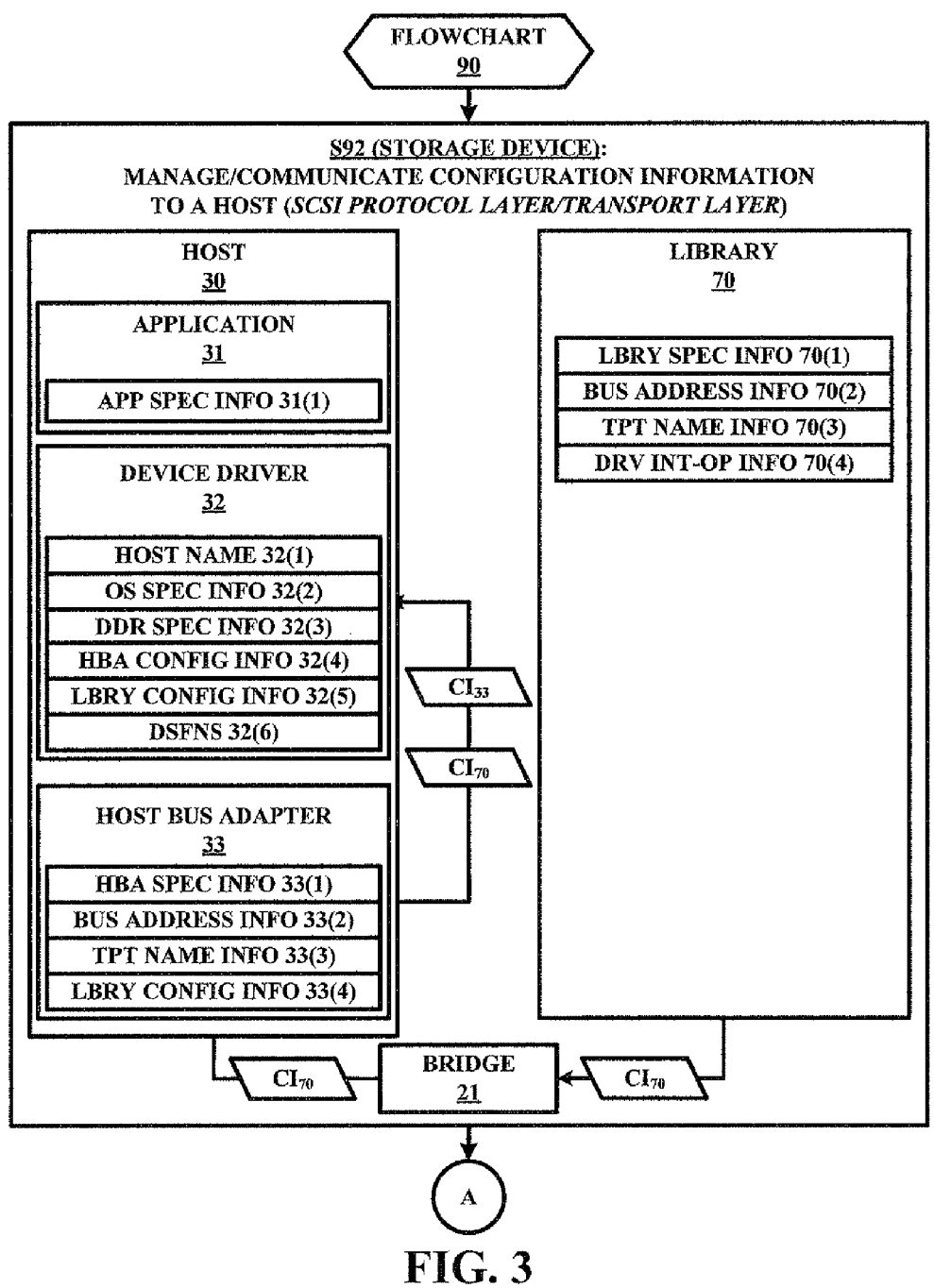
FIGS. 3-5 illustrate a flowchart representative of one embodiment of an information exchange method in accordance with the present invention.
Figure 4:
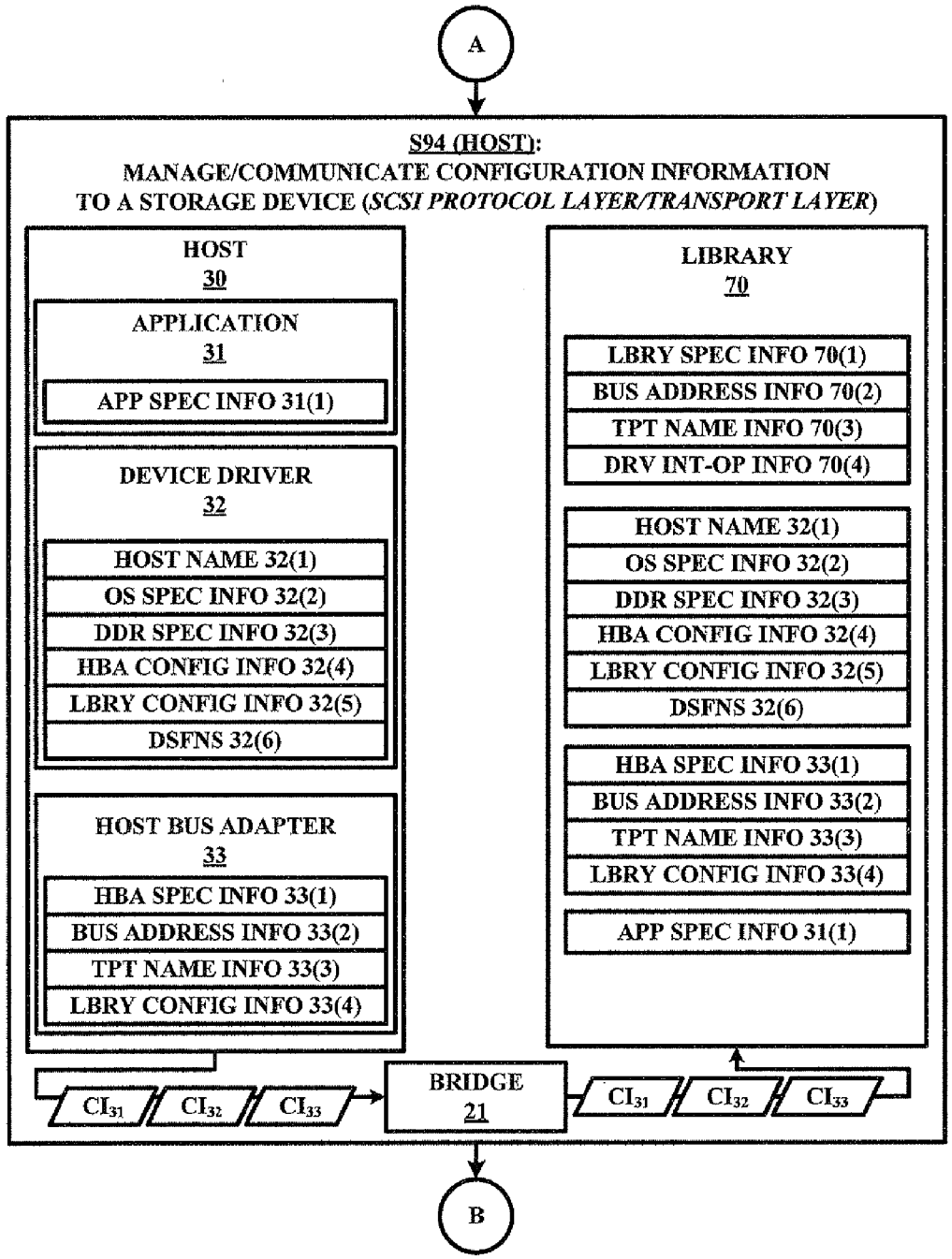
Figure 5:
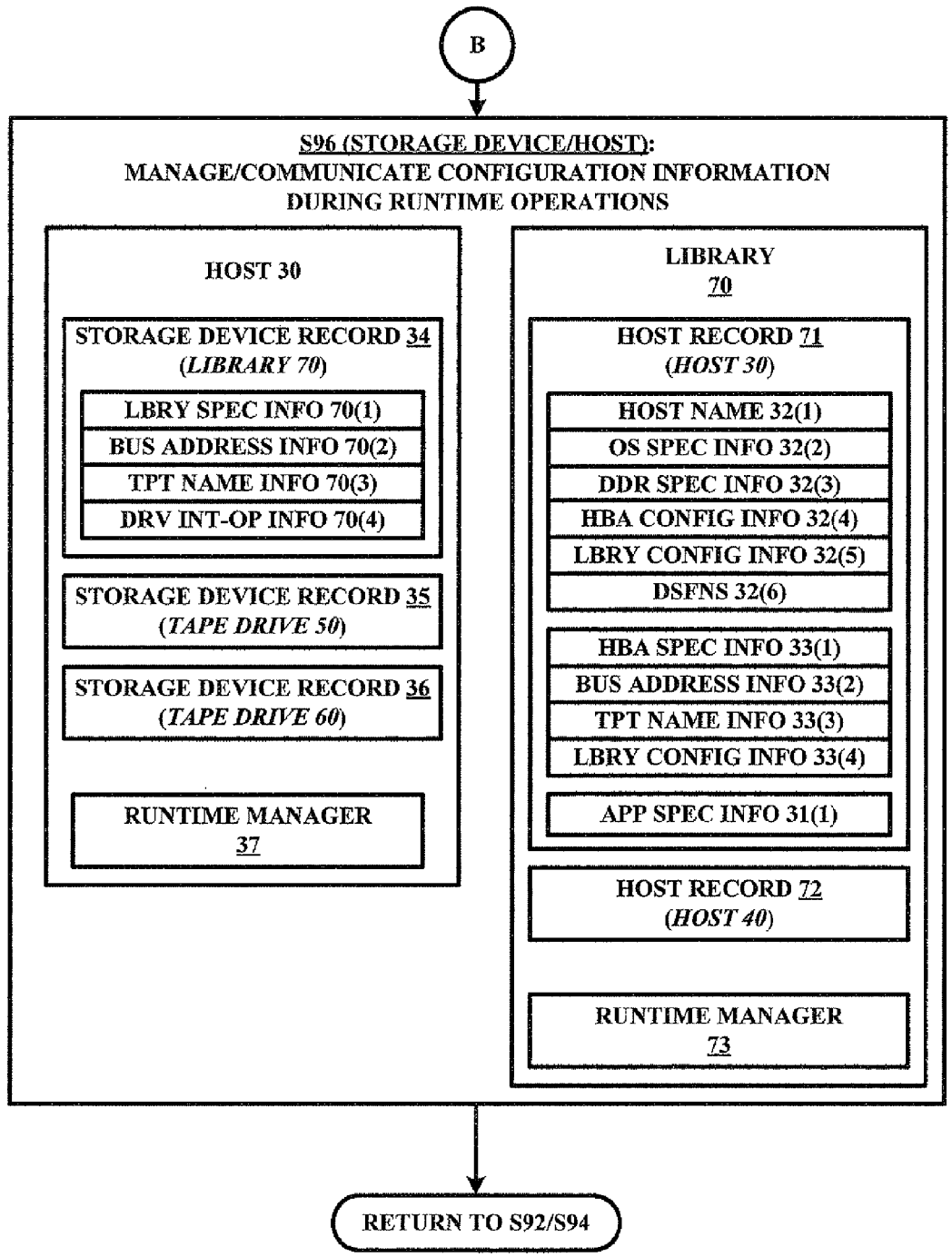

Referring to FIGS. 3-5, the information exchange method as represented by flowchart 90 is executable during and/or subsequent to a configuration of host 30 and library 70 as needed for purposes of supporting I/O operations.

Referring to FIG. 3, a stage S92 of flowchart 90 encompasses a storage device managing and communicating its configuration information to a host. In one exemplarily embodiment, the storage device includes its configuration information in a data management layer of a communication model of any type (e.g., a SCSI protocol layer of a SCSI architectural model) for subsequent communication of the configuration information to the host via data communication layer(s) of the communication model (e.g., a parallel SCSI transport layer, a fibre channel transport layer or a SSA transport layer of a SCSI architectural model).

For example, in the context of FIG. 2 as shown in stage S92, library 70 includes its configuration information $CI_{70}$ in a SCSI protocol layer and communicates Configuration information $CI_{70}$ to host 30 via service delivery subsystem 21. In this example, configuration information $CI_{70}$ includes, but is not limited to, information 70(1)-70(4).

In response thereto, host bus adapter 33 stores library configuration information $CI_{70}$ as library configuration information 33(4) and communicates configuration information $CI_{70}$ as well as its configuration information $CI_{33}$ to device driver 32. Configuration information $CI_{33}$ includes, but is not limited to, information 33(1)-33(4).

Device driver 32 stores configuration information $CI_{33}$ as HBA configuration information 32(4) and configuration information $CI_{70}$ as library configuration information 32(5). Additionally, based on library configuration information 32(5), device driver 32 establishes device special file names 32(6) for the various drives of library 70.

Referring to FIG. 4, a stage S94 of flowchart 90 encompasses a host managing and communicating its configuration information to a storage device. In one exemplarily embodiment, the host includes its configuration information in a data management layer of a communication model of any type (e.g., a SCSI protocol layer of a SCSI architectural model) for subsequent communication of the configuration information to the storage device via data communication layer(s) of the communication model (e.g., a parallel SCSI transport layer, a fibre channel transport layer or a SSA transport layer of a SCSI architectural model).

For example, in the context of FIG. 2 as shown in stage S94, host 30 includes configuration information $CI_{31}$, $CI_{32}$, $CI_{33}$ in a SCSI protocol layer and communicates configuration information $CI_{31}$, $CI_{32}$, $CI_{33}$ in to library 70 via service delivery subsystem 21. In this example, configuration information $CI_{31}$ includes, but is not limited to, information 31(1); configuration information $CI_{32}$ includes, but is not limited to, information 32(1)-32(3) and 32(6); and configuration information $CI_{33}$ includes, but is not limited to, information 33(1)-33(3).

Referring to FIG. 5, a stage S96 of flowchart 90 encompasses a host managing and communicating configuration information of a storage device during runtime operations, and a storage device managing and communicating configuration information of a host during runtime operations. This stage primarily involves the host establishing and maintaining a record of the configuration information of each configured storage device therein and the storage device similarly establishing and maintaining a record of the configuration information of each configured host therein, particularly the host name and the DSFN(s), to thereby facilitate the host and the storage device in dynamically collecting and retrieving runtime information based on the recorded configuration information. For example, as shown in stage S96, host 30 establishes and maintains a storage drive record 34 for library 30 via device driver 32 (FIG. 2) whereby a runtime manager 37 of host 30 may include the configuration information of library 70 in a SCSI protocol layer as needed for subsequent communication of the library configuration information via a SCSI transport layer to library 70, host 40 (FIG. 1), storage device 50 (FIG. 1) and storage device 60 (FIG. 1). Host 30 also establishes and maintains a storage drive record 35 for tape drive 50 and a storage drive record 36 for optical drive 60 via device driver 32 for runtime information exchanges.

Similarly, library 70 establishes and maintains a host record 71 for host 30 whereby a runtime manager 73 of library 70 may include the configuration information of host 30 in a SCSI protocol layer as needed for subsequent communication of the host configuration information via a SCSI transport layer to host 30, host 40, storage device 50 and storage device 60. Library 70 also establishes and maintains a host record 72 for host 40 for runtime information exchanges.

Referring to FIG. 1, flowchart 90 is executed between each host 30, 40 and storage device 50, 60, 70 to enable the exchange of configuration information during runtime operations. In practice, the present invention does not impose any limitations or any restrictions to the manner by which the configuration information is exchanged during runtime operations. For example, in the context of host records for host 30 and 40 that is maintained by library 70, host configuration information provided by library 70 to host 30 and/or host 40 during runtime operations may include, but is not limited to: (1) a host name any other relevant information of which host between hosts 30 and 40 most recently performed a particular I/O operation (e.g., Read, Write, etc.); (2) a host name any other relevant information of which host between hosts 30 and 40 most recently performed the last Read Position of a tape drive of library 70; (3) a host name any other relevant information of which host between hosts 30 and 40 most recently executed a reservation of a tape drive of library 70 as well as the type of reservation (e.g., legacy SCSI-2 reservation and a SCSI-3 persistent reservation); (4) a host name any other relevant information of which host between hosts 30 and 40 executed the last Prevent/Allow Medium Removal for library 70; and (5) device special file names configured on hosts 30 and 40 for each tape drive of library 70 access by hosts 30 and 40.

Additionally, the exchanged configuration information may include, but is not limited to: (1) any other relevant information of which host between hosts 30 and 40 most recently issued a particular type of command on a tape drive of library 70 (e.g., a Medium Access Command, an issued PAMR, an unsupported command, the last command etc.); (2) any other relevant information of which host between hosts 30 and 40 read the last device log x from a tape drive of library 70; and (3) any other relevant information of which host between hosts 30 and 40 most recently received check condition with sense key 3 (medium error) and/or sense key 4 (hardware error).

An example of runtime configuration information management/communication by library 70 will now be described herein in connection with the description of FIGS. 6-9.

Figure 6:
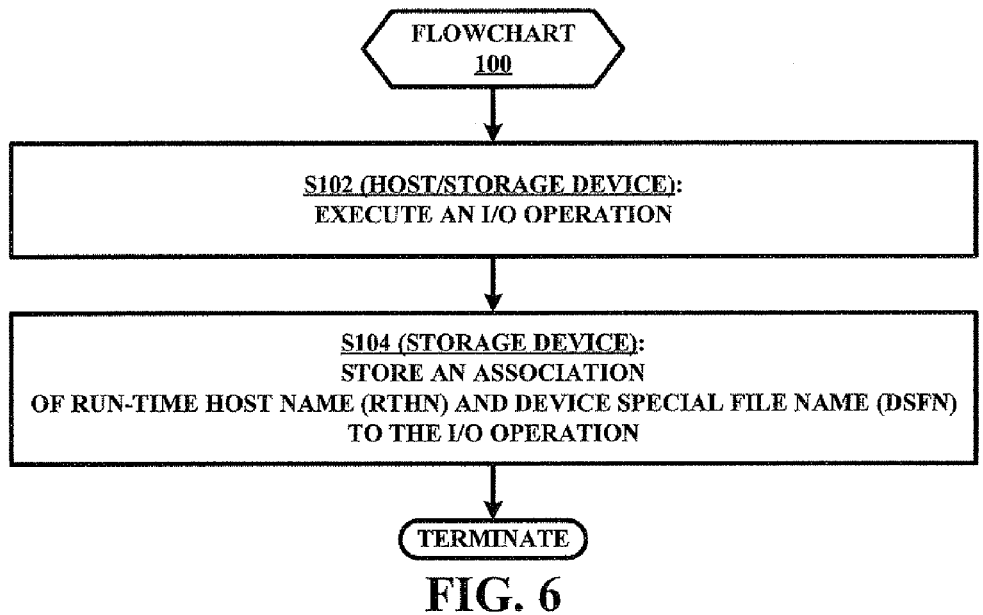
FIG. 6 illustrates a flowchart representative of one embodiment of a dynamic information provision method in accordance with the present invention.

Referring to FIG. 6, a flowchart 100 representative of a dynamic information provision method is shown. Specifically, a stage S102 of flowchart 100 encompasses an execution of an I/O operation by a host and a storage device, such as, for example, an execution of a drive access operation by host 30 and library 70 as shown in FIG. 7 that involves a reservation of a tape drive.

Figure 7:
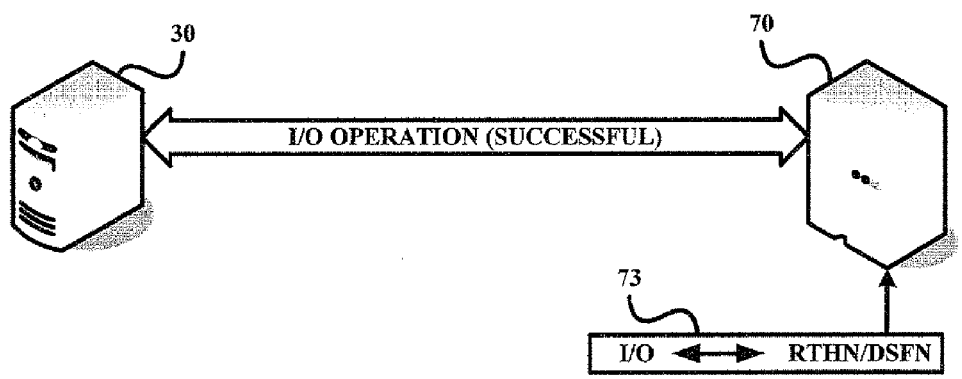
FIG. 7 illustrates an exemplary execution of the flowchart illustrated in FIG. 6 in accordance with the present invention.

A stage S104 of flowchart 100 encompasses the storage device storing an association of the run-time host name ("RTHN") of host 30 and DSFN of the tape drive established by host 30 to the I/O operation, such as, for example, library 70 storing an association 73 of the run-time host name ("RTHN") of host 30 and DSFN of the tape drive established by host as shown in FIG. 7 to the execution of a drive access operation by host 30 involving the reservation of the tape drive.

Figure 8:
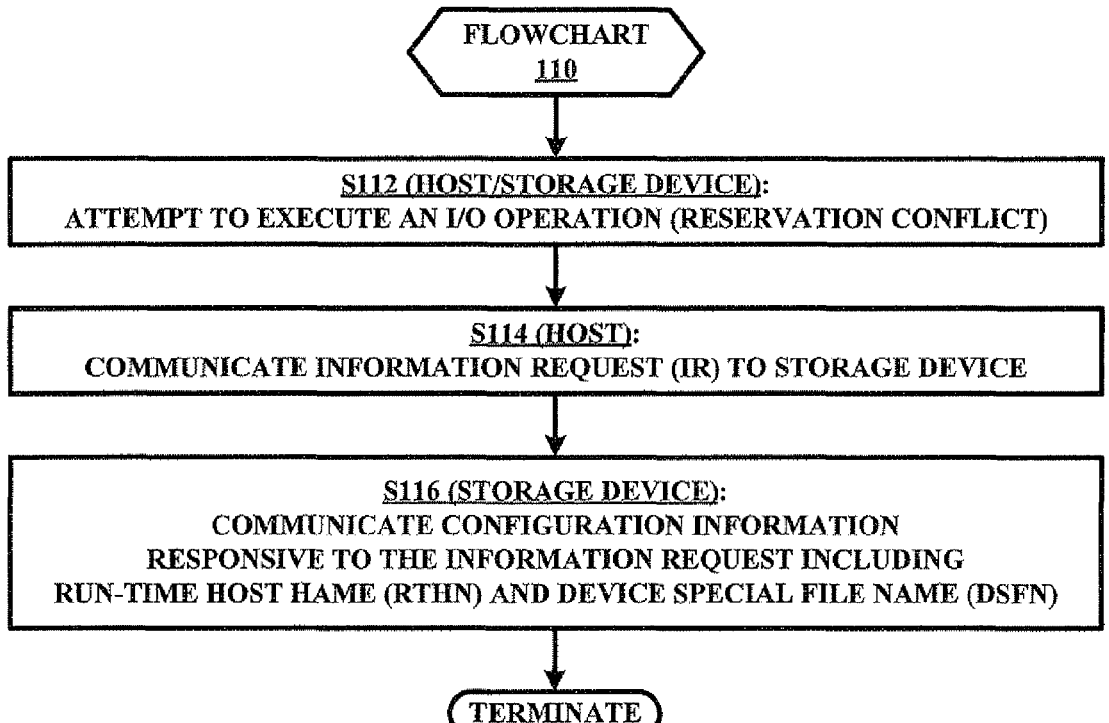
FIG. 8 illustrates a flowchart representative of one embodiment of a dynamic information retrieval method in accordance with the present invention.

Referring to FIG. 8, a flowchart 110 representative of a dynamic information retrieval method of the present invention is shown. Specifically, a stage S112 of flowchart 110 encompasses a failed attempt to execute an I/O operation by a host and a storage device, such as, for example, a failed attempt to execute a drive access operation by host 40 and library 70 as shown in FIG. 9 that involves a Reservation Conflict error message being communicated from library 70 to host 40.

Figure 9:
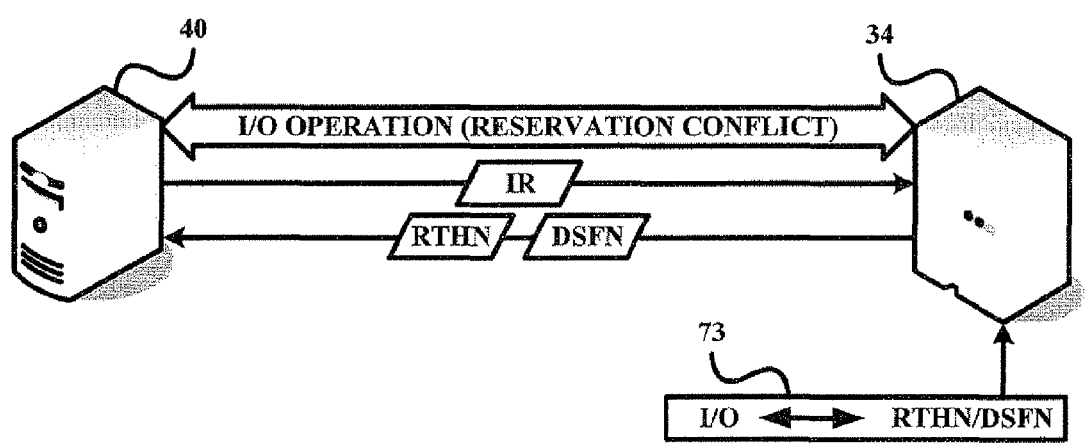
FIG. 9 illustrates an exemplary execution of the flowchart illustrated in FIG. 8 in accordance with the present invention.

A stage S114 of flowchart 110 encompasses the host communicating an information request for the host name and DSFN associated with the failed I/O operation, such as, for example, a communication by host 40 to library 70 as shown in FIG. 9 of an information request IR for a host name and DSFN associated with Reservation Conflict error message.

A stage S116 of flowchart 110 encompasses the storage device communicating the host name and the DSFN to the host in response to the information request, such as, for example, library 70 including host name RTHN and device special file name DSFN of host 30 in a SCSI protocol layer to thereby communicate host name RTHN and device special file name DSFN of host 30 via a SCSI transport layer to host 40 in response to information request IR. As a result, a user of host 40 has the option to issue a Release command to clear the reservation by host 30 instead of resetting the tape drive to clear the reservation.

In an alternative embodiment of flowchart 110, stage S114 may be omitted whereby the storage device automatically provides relevant configuration information to the host based on the results of stage S112, such as, for example, library 70 automatically communicating host name RTHN and device special file name DSFN of host 30 to host 40 based on the generation of the Reservation Conflict error message.

A further example of flowcharts 100 and 110 involves an I/O operation directed to unloading a tape cartridge from a tape drive in a library. In this example, host 30 loads a tape cartridge into a tape drive of library 70 and issues a Prevent Medium Removal command. Upon completion of the I/O operation, library 70 stores an association of the Prevent Medium Removal command to a host name FIN of host 30 and device special file name DSFN of the tape drive as configured on host 30. Thus, when host 40 subsequently attempts to unload the tape cartridge from the tape drive, library 70 will be able to retrieve host name HN of host 30 and device special file name DSFN of the tape drive as configured on host 30 and communicate this information to host 40 whereby host 40 may issue an Allow Medium Removal command without having to reset the tape drive.

Referring to FIGS. 1-9, those having ordinary skill in the art will appreciate numerous benefits and advantages of the various exemplarily embodiments of the present invention including, but not limited to, a dynamic exchange of configuration information between host(s) and storage device(s) for purposes of facilitating I/O operations in a more efficient and informative manner. Those having ordinary skill in the art will further appreciate how to apply the inventive principles of the various exemplarily embodiments of present invention to any type of host, any type of storage device (e.g., an automated data library) and any type of storage environment (e.g., a SCSI based SAN).

The following description of FIGS. 10-21 encompasses exemplarily formats that can be used in practicing the various embodiments of the present invention, particularly in the context of a SCSI architectural model.

Figure 10:
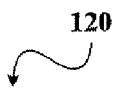
Figure 11:
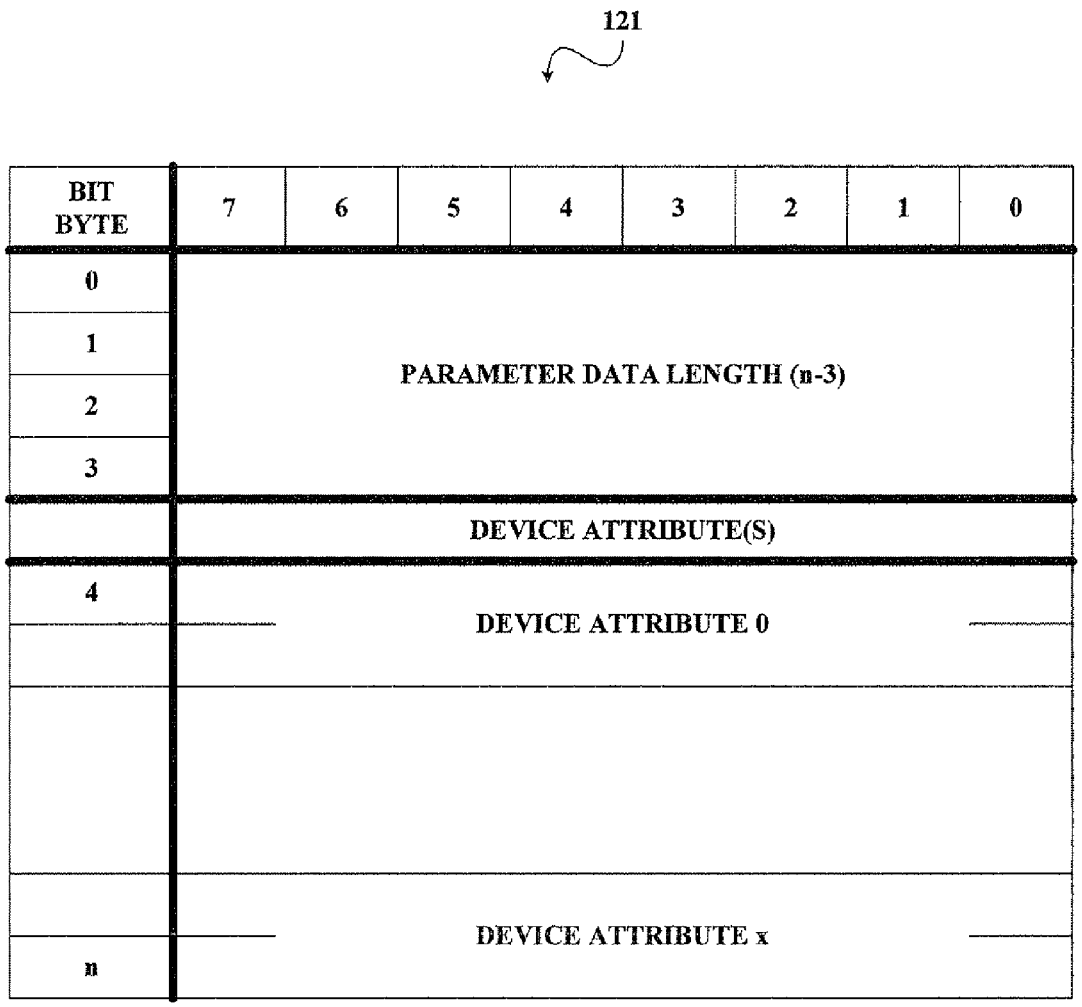
Figure 14:
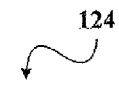
Figure 15:
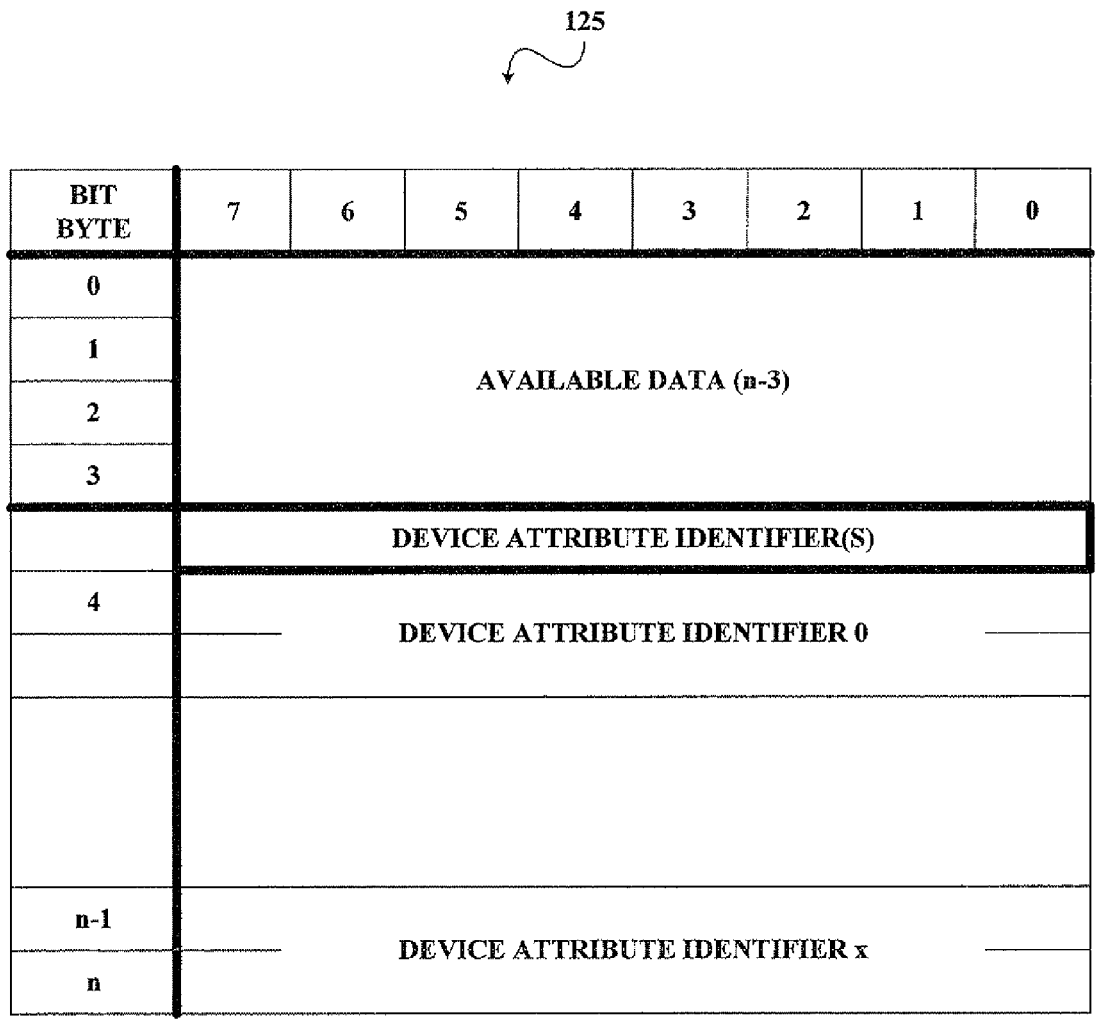

Specifically, for communications for a host to the storage device, FIG. 10 illustrates a Set Device Attributes Table 120 and FIG. 11 illustrates a Parameter List Table 121. Attributes should be sent in ascending order. If the attributes are not in order, then no attributes shall be changed and a Set Device Attribute command shall be terminated with CHECK CONDITION status, with the sense key set to ILLEGAL REQUEST, and the additional sense code set to INVALID FIELD IN PARAMETER LIST.

For communications from a storage device to a host, FIG. 12 illustrates a Report Device Attributes Table 122 and FIG. 13 illustrates a Report Device Attribute Service Action Codes Table 123. The First Device Attribute Identifier field specifies the device attribute identifier of the first attribute to be returned. If the specified device attribute is in the unsupported state or nonexistent state, the Report Device Attribute command shall be terminated with CHECK CONDITION status, with the sense key set to ILLEGAL REQUEST, and the additional sense code set to INVALID FIELD CDB.

Further, a Report Device Attribute command with Device Attribute Values service action returns parameter data containing the attributes set by the previous Set Device Attribute command from this I_T Nexus, and the First Attribute Identifier field in the CDB. The returned parameter data shall contain the requested attributes in ascending numerical order by attribute identifier value and in the formal in accordance with a Report Device Attribute With Device Attribute Values Service Action Table 124 shown in FIG. 14. The Available Data field shall contain the number of bytes of attribute information in the parameter list. The value in the Available Data field shall not be adjusted by the CDB Allocation Length field.

Additionally, the Report Device Attribute command with Device Attribute List service actions returns parameter data containing the attribute identifiers for the attributes that are not in the unsupported state and not in the nonexistent state. The contents of First Device Attribute Identified field in the CDB shall be ignored. The returned parameter data shall contain the requested device attribute identifier in ascending numerical order by device attribute identifier value and in the format in accordance with a Report Device Attribute With Device Attribute List Service Action Table 125 shown in FIG. 15. The Available Data field shall contain the number of bytes of attribute identifiers in the parameter list. The Available Data field shall not be adjusted by the CDB Allocation Length Field. An Attribute Identifier field is returned for each attribute that is not in the unsupported state and not in the nonexistent state.

Figure 16:
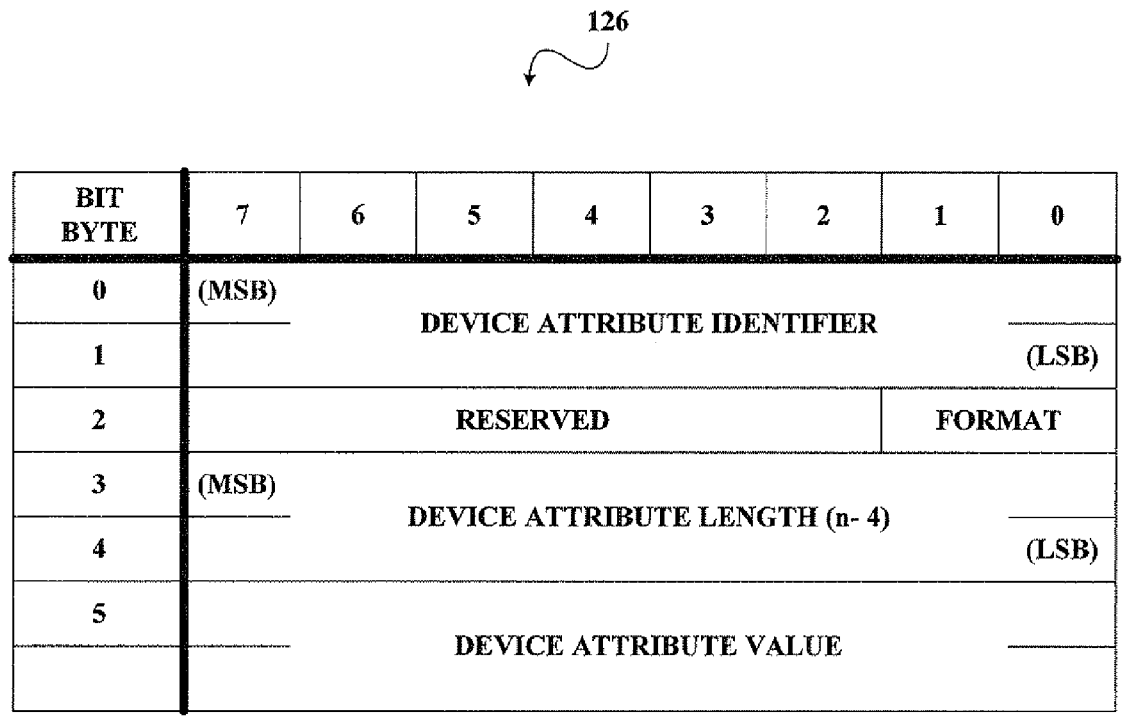

FIG. 16 illustrates a Device Attribute Format Table 126 with a Device Attribute Identifier field containing a code value identifying the attribute and a Format field describing the format of the data in the Device Attribute Value field. FIG. 17 illustrates a Device Attribute Formats Table 127 for the Format field of Table 126 with the Device Attribute Length field specifying the length in bytes for the Device Attribute Value field and the Device Attribute Value field containing the current value for the Report Device Attribute command or an intended value for the Set Device Attribute command.

FIG. 18 illustrates a Host Owned Attributes Table 128, FIG. 19 illustrates a Library Owned Attributes Table 129 and FIGS. 20-21 illustrate a Device Owned Attributes Table 130. These tables list potential attributes to be collected in accordance with the present invention.

Those having ordinary skill in the art may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A host system, comprising:
a processor; and
a memory storing instructions operable with the processor for a configuration information exchange between the host system and a storage device, the instructions being executed for:
the host system managing host system configuration information in a management layer of a communication model; and
the host system communicating the host system configuration information to the storage device by at least one communication layer of the communication model; and
wherein
the host system manages storage device configuration information in the management layer of the communication model; and
the host system communicates the storage device configuration information to the storage device by the at least one communication layer of the communication model.

2. The host system of claim 1, wherein the host system configuration information includes a host system name representative of the host system as configured on the host system.

3. The host system of claim 1, wherein the host system configuration information includes a device special file name representative of the storage device as configured on the host system.

4. The host system of claim 1, wherein the host system configuration information includes operating system specification information indicative of operational details of an operating system of the host system.

5. The host system of claim 1, wherein the host system configuration information includes device driver configuration specification indicative of operational details of a device driver of the host system.

6. The host system of claim 1, wherein the host system configuration information includes host system bus adapter specification information indicative of operational details of a host system bus adapter of the host system.

7. The host system of claim 1, wherein the host system configuration information includes application specification information indicative of operational details of an application of the host system.

8. The host system of claim 1, wherein the host system configuration information includes bus address information associated with I/O operations of the host system.

9. The host system of claim 1, wherein the host system configuration information includes transport name associated with I/O operations of the host system.

10. A method for a configuration information exchange between a host system and a storage device, the method comprising:
the host system managing host system configuration information in a management layer of a communication model; and
the host system communicating the host system configuration information to the storage device by at least one communication layer of the communication model; and
wherein
the host system manages storage device configuration information in the management layer of the communication model; and
the host system communicates the storage device configuration information to the storage device by the at least one communication layer of the communication model.

11. The method of claim 10, wherein the host system configuration information includes a host system name representative of the host system as configured on the host system.

12. The method of claim 10, wherein the host system configuration information includes a device special file name representative of the storage device as configured on the host system.

13. The method of claim 10, wherein the host system configuration information includes operating system specification information indicative of operations details of an operating system of the host system.

14. The method of claim 10, wherein the host system configuration information includes device driver specification information indicative of operations details of a device driver of the host system.

15. The method of claim 10, wherein the host system configuration information includes host system bus adapter specification information indicative of operations details of a host system bus adapter of the host system.

16. The method of claim 10, wherein the host system configuration information includes application specification information indicative of operations details of an application of the host system.

17. The method of claim 10, wherein the host system configuration information includes bus address information associated with I/O operations of the host system.

18. The method of claim 10, wherein the host system configuration information includes transport name associated with I/O operations of the host system.

19. The method of claim 10, further comprising:
the storage device managing storage device configuration information in the management layer of the communication model; and
the storage device communicating the storage device configuration information to the host system by the at least one communication layer of the communication model.

20. The method of claim 19, wherein the storage device configuration information includes library specification information indicative of operations details of at least one component of a library.

21. The method of claim 19, wherein the storage device configuration information includes bus address information associated with I/O operations of a library.

22. The method of claim 19, wherein the storage device configuration information includes transport name associated with I/O operations of a library.

23. The method of claim 19, wherein the storage device configuration information includes drive inter-operational information indicative of relationships between a plurality of drives of the storage device.

24. The method of claim 19, further comprising:
the storage device managing additional host configuration information in the management layer of the communication model; and
the storage device communicating the additional host configuration information to the host system by the at least one communication layer of the communication model.

25. A host system, comprising:
a processor; and
a memory storing instructions operable with the processor for a configuration information exchange between the host system and a storage device, the instructions being executed for:
the host system managing host system configuration information in a management layer of a communication model, the host system configuration information including a host system name representative of the host system as configured on the host system, a device special file name representative of the storage device as configured on the host system, operating system specification information indicative of operational details of an operating system of the host system, device driver configuration specification indicative of operational details of a device driver of the host system, host system bus adapter specification information indicative of operational details of a host system bus adapter of the host system, application specification information indicative of operational details of an application of the host system, bus address information associated with I/O operations of the host system, and, bus address information associated with I/O operations of the host system; and
the host system communicating the host system configuration information to the storage device by at least one communication layer of the communication model; and wherein
the host system manages storage device configuration information in the management layer of the communication model; and
the host system communicates the storage device configuration information to the storage device by the at least one communication layer of the communication model.

* * * * *